(12) United States Patent
Piasecki et al.

(10) Patent No.: US 7,558,032 B2
(45) Date of Patent: Jul. 7, 2009

(54) PROTECTION SYSTEM FOR MEDIUM-VOLTAGE POTENTIAL TRANSFORMERS

(75) Inventors: Wojciech Piasecki, Cracow (PL);
Marek Florkowski, Cracow (PL);
Mariusz Luto, Bialystok (PL); Pentti Mahonen, Vaasa (FI)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 10/564,574

(22) PCT Filed: Jul. 8, 2004

(86) PCT No.: PCT/PL2004/000053

§ 371 (c)(1),
(2), (4) Date: Sep. 11, 2006

(87) PCT Pub. No.: WO2005/008859

PCT Pub. Date: Jan. 27, 2005

(65) Prior Publication Data

US 2007/0103823 A1    May 10, 2007

(30) Foreign Application Priority Data

Jul. 17, 2003    (PL) .................................... 361320

(51) Int. Cl.
*H02H 7/04* (2006.01)
(52) U.S. Cl. .............................. 361/38; 361/35; 361/37; 361/41
(58) Field of Classification Search ............. 361/35–41, 361/42–50
See application file for complete search history.

(56) References Cited

U.S. PATENT DOCUMENTS

| | | | | | |
|---|---|---|---|---|---|
| 3,401,272 | A | * | 9/1968 | Rosa et al. | 307/327 |
| 3,467,903 | A | * | 9/1969 | Streater | 318/791 |
| 3,569,673 | A | * | 3/1971 | Clark | 219/501 |
| 4,358,813 | A | * | 11/1982 | Sato et al. | 361/263 |
| 4,466,039 | A | * | 8/1984 | Moran et al. | 361/35 |
| 4,794,948 | A | * | 1/1989 | Schempp | 137/554 |
| 5,012,182 | A | * | 4/1991 | Fujiki et al. | 324/96 |
| 5,778,429 | A | * | 7/1998 | Sukegawa et al. | 711/129 |
| 5,939,839 | A | * | 8/1999 | Robel et al. | 315/289 |
| 6,567,249 | B1 | * | 5/2003 | Berndt | 361/38 |

FOREIGN PATENT DOCUMENTS

DE    1265836    *    4/1968

* cited by examiner

*Primary Examiner*—Stephen W Jackson
*Assistant Examiner*—Terrence R Willoughby
(74) *Attorney, Agent, or Firm*—Michael M. Rickin; Paul R. Katterle

(57) ABSTRACT

A protection system for a transformer system that includes three single phase transformers with auxiliary secondary windings, respectively. The auxiliary secondary windings are connected to form an open delta configuration. The protection system is connected into the open delta configuration, between the auxiliary secondary windings of two of the transformers. The protection system includes a circuit having an element with a threshold voltage and current characteristic connected in series with a thermal protection device and a resistor.

14 Claims, 2 Drawing Sheets

PROTECTION SYSTEM FOR MEDIUM-VOLTAGE POTENTIAL TRANSFORMERS

Figure 1:
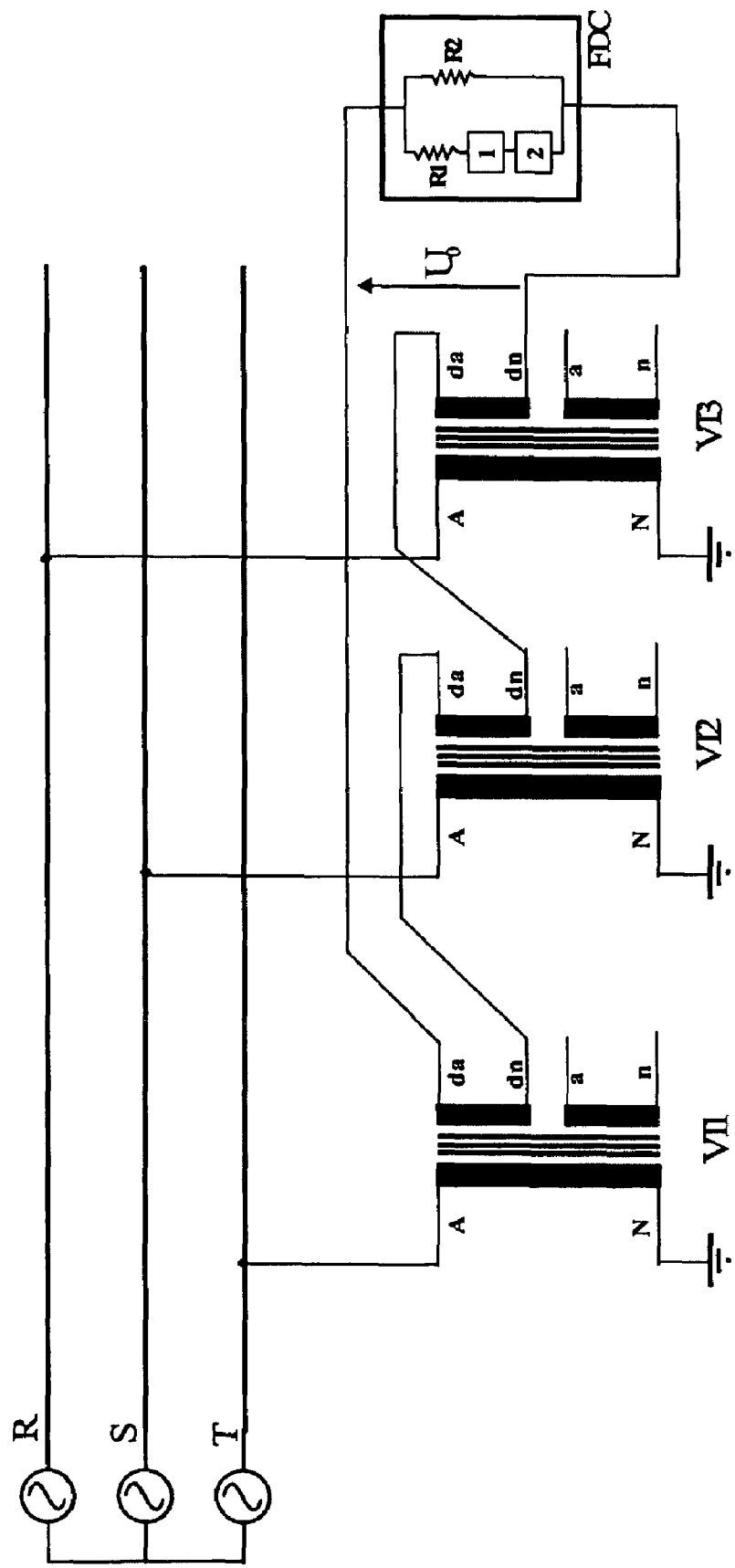

The subject of the invention is a protection system for medium-voltage potential transformers, finding application in the attenuation of ferroresonant states occurring in at least one of three potential transformers in a three-phase medium-voltage network.

For the attenuation of ferroresonant states in electrical equipment, and especially in potential transformers, a protecting resistor of a resistance of several dozen ohms is typically used. Such a resistor is connected to three auxiliary secondary windings of three single-phase transformers forming an open delta system. Though this solution employs a simple design, it has significant disadvantages. In case of sustained unbalance in the supply network, the small resistance value of the protecting resistor, which is required for the effectiveness of ferroresonant oscillation attenuation, brings about the danger of thermal damage to the transformer or the resistor itself. In practice, attenuating resistors of powers of several hundred watts and of large dimensions are used.

PTC resistors, bimetallic circuit breakers or thermal fuses are commonly used to protect electrical equipment against thermal damage caused, for example, by voltage overload.

For example, a module protecting a telecommunication system, which consists of a PTC thermistor connected in series into the subscriber's line winding and a thyristor diode which is connected in parallel between the subscriber's line winding and ground is known from a German patent application No. 3621200. If undesired voltage appears in the subscriber's line, then current flowing through the thyristor diode heats it up and consequently the thermistor is heated up as well, because the diode is thermally connected with the PTC thermistor. As a result, the thermistor resistance increases and the voltage overload is reduced.

The essence of the medium-voltage potential transformer protection system comprising an attenuating resistor connected into the open delta system of three auxiliary secondary windings of three single-phase transformers is that an element having a threshold voltage and current characteristic and a thermal fuse are connected in series between the attenuating resistor and the output of the auxiliary secondary winding of one of the single-phase transformers.

Preferably the thermal fuse has the form of a bimetallic circuit breaker, and the element with threshold voltage and current characteristic has the form of two Zener diodes push-pull connected with one another.

As an alternative, the thermal fuse has the form of a PTC resistor, and the element with the threshold characteristic has the form of two Zener diodes push-pull connected with one another.

Preferably the thermal fuse is a PTC resistor, and the element with the threshold characteristic is a varistor.

As an alternative, the thermal fuse is a bimetallic circuit breaker, and the element with the threshold voltage and current characteristic is a varistor.

The advantage of the inventive system is that it assures the attenuation of ferroresonant oscillations while being insensitive to small values of zero-sequence voltage, which occur in case of small unbalance in a three-phase network. In case of sustained zero-sequence voltage, for instance one generated as a result of an earth fault of one of the phases, the use of a thermal fuse provides additional protection of the transformers and of the elements of the protection system that protects the transformers against damage. The use of the thermal protection allows to decrease the thermal power of the attenuating resistor compared to earlier solutions. That is why the inventive system is efficient and its dimensions are small compared to existing protecting devices.

Figure 3:
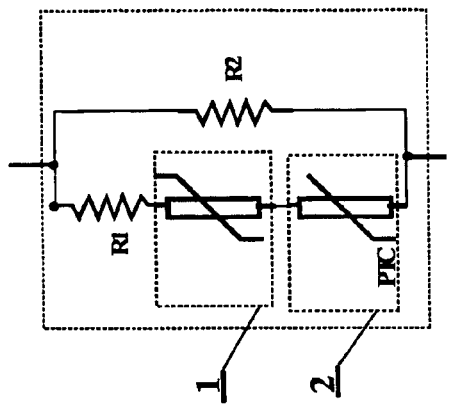
Figure 5:
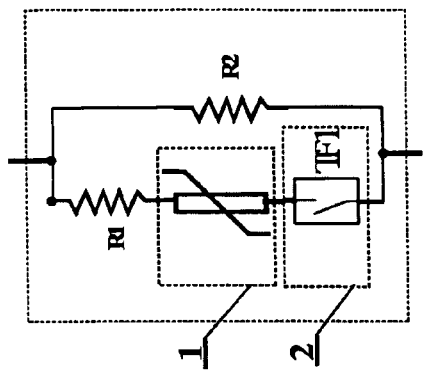
Figure 2:
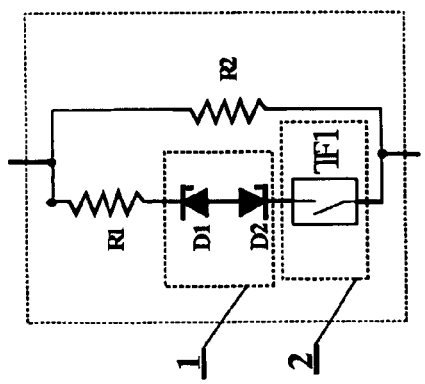
Figure 4:
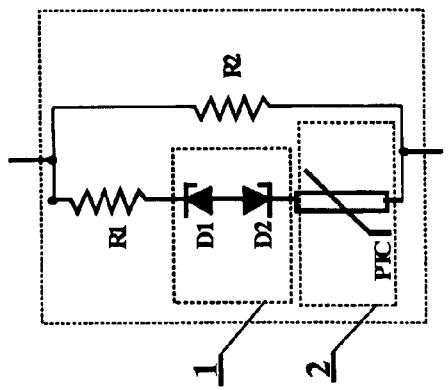

The subject of the invention is presented in an embodiment in the drawing, where FIG. 1 shows a system of potential transformers connected to a protecting system, FIG. 2—the first variant of the protecting system embodiment FDC1, FIG. 3—the second variant of the protecting system embodiment FDC2, FIG. 4—the third variant of the protecting system embodiment FDC3, and FIG. 5—the fourth variant of the protecting system embodiment FDC4.

The auxiliary windings of three single-phase potential transformers VT1, VT2, VT3 are connected with one another to form an open delta arrangement. Primary windings A-N are directly connected with a three-phase network RST and earth. The terminals of the secondary windings a-n of the individual transformers are the working outputs of these transformers. The terminals of the auxiliary secondary windings da and dn of the transformers are connected with one another in such way that the terminal da of the auxiliary secondary winding of the transformer VT1 is connected with the input of the protection system FDC, whose output is connected with the terminal dn of the auxiliary secondary winding of the third transformer VT3, and whose terminal da is connected with the terminal dn of the auxiliary secondary winding of the second transformer VT2. Next, the terminal da of the second transformer VT2 is connected with the terminal dn of the first transformer VT1. During the device operation, between the terminal da of the first transformer VT1 and the terminal dn of the third transformer VT3 voltage $U_0$ appears, which is applied to the terminals of the protection system FDC.

The protecting system FDC comprises branches interconnected in parallel, and in the first FDC1 variant of the system embodiment, one branch contains: an attenuating resistor R1, two Zener diodes D1, D2 push-pull connected with one another and a bimetallic circuit breaker TF1, interconnected in series. Two push-pull connected Zener diodes can be substituted with one bi-directional Zener diode, which is not shown in the drawing. The other branch of the system contains a resistor R2.

In the second FDC2 variant of the system embodiment, one branch contains: resistor R1, two Zener diodes D1,D2 push-pull connected with one another and a PTC resistor, interconnected in series. The two push-pull connected Zener diodes can be substituted with one bi-directional Zener diode, which is not shown in the drawing. The other branch of the system contains a resistor R2.

In the third FDC3 variant of the system embodiment, one branch contains: a resistor R1, a varistor and a PTC resistor, interconnected in series. The other branch of the system contains a resistor R2.

In the fourth FDC4 variant of the system embodiment, one branch contains: resistor R1, a varistor and a bimetallic circuit breaker TF1, interconnected in series. The other branch of the system contains a resistor R2.

In all variants of the invention embodiment the resistor R2 has a value considerably larger than the resistance from the resistor R1.

The operation of the inventive system is as follows:

In case of full balance in a three-phase network, the zero-sequence voltage $U_0$ has a value=0 and no current flows through the protection system FDC. In case of insignificant unbalance in the three-phase network, voltage $U_0$ has a nonzero value, but less than the value of the threshold voltage of the element with a threshold voltage and current characteristic. In such case, current of a value of $U_0/R2$ flows through the protection system FDC. Since the resistance of the resistor R2 has a large value (R2>>R1), current flowing through the protection system FDC has a small value. Therefore, also the thermal power emitted in the protection system FDC is in such case insignificant. For example: if R2 has a value of 200 Ohm, then if the value $U_0=10V$, the thermal power emitted in the system FDC has a value of 0.5 W.

In the event that a ferroresonant state occurs in the three-phase network, voltage $U_0$ has a value exceeding the threshold value of the element with threshold voltage and current characteristic. In that case, current flows through the resistor R1. Due to a small value of the resistor R1 a very rapid attenuation of ferroresonant oscillations occurs. Since the branch with the resistor R1 works for a short time, thermal energy emitted in this branch has an insignificant value. Therefore neither the branch elements overheat nor the thermal fuse is actuated.

In the event that a considerable sustained unbalance in a three-phase network occurs, which may be caused, for instance, by an earth fault of one of the phase conductors, voltage $U_0$ has also a value bigger than the threshold voltage of the element with threshold voltage and current characteristic. Therefore a current of high intensity flows through the branch with the resistor R1. However, since such condition does not require the action of the attenuating resistor, the thermal fuse in the form of a bimetallic fuse or a PTC resistor causes a large increase in the resultant resistance of the branch that contains the resistor R1, or its complete disconnection. Then no current flows through this branch, or low-intensity current flows through it. When the cause of the unbalance disappears and the thermal fuse cools down, the system will reset.

The invention claimed is:

1. A protecting system for three single phase transformers having three auxiliary secondary windings that are connected to form an open delta configuration, the protecting system comprising:
    an attenuating resistor connected into the open delta configuration of the three auxiliary secondary windings of the three single-phase transformers,
    an element with a threshold voltage and current characteristic (1), and
    a thermal fuse (2), and
    wherein the element and the thermal fuse are connected in series between the attenuating resistor and an output of the auxiliary secondary winding of one of the single-phase transformers.

2. The protecting system according to claim 1, wherein the thermal fuse (2) comprises a bimetallic circuit breaker (TF1), and the element with a threshold voltage and current characteristic comprises two Zener diodes (D1, D2), push-pull connected with one another.

3. The protecting system according to claim 1, wherein the thermal fuse (2) comprises a PTC resistor, and the element with a threshold voltage and current characteristic comprises two Zener diodes push-pull connected with one another.

4. The protecting system according to claim 1, wherein the thermal fuse (2) is a PTC resistor, and the element with a threshold voltage and current characteristic is a varistor.

5. The protecting system according to claim 1, wherein the thermal fuse (2) is a bimetallic circuit breaker (TF1), and the element with a threshold voltage and current characteristic is a varistor.

6. The protecting system of claim 1, further comprising a second resistor connected in parallel with the thermal fuse and the element with a threshold voltage and current characteristic.

7. The protecting system of claim 6, wherein the second resistor has a larger resistance than the attenuating resistor.

8. A transformer system comprising:
    three single phase transformers having auxiliary secondary windings, respectively, the auxiliary secondary windings being connected to form an open delta configuration; and
    a protection system connected into the open delta configuration, between the auxiliary secondary windings of two of the transformers, the protection system comprising a circuit having an element with a threshold voltage and current characteristic connected in series with a thermal protection device and a resistor.

9. The transformer system of claim 8, wherein the resistor is a first resistor and the circuit comprises two legs connected in parallel, the first leg including the thermal protection device, the first resistor and the element with a threshold voltage and current characteristic, and the second leg including a second resistor.

10. The transformer system of claim 9, wherein the second resistor has a greater resistance than the first resistor.

11. The transformer system of claim 10, wherein the thermal protection device comprises a bimetallic circuit breaker, and the element with a threshold voltage and current characteristic comprises a pair of Zener diodes connected together in a push-pull arrangement.

12. The transformer system of claim 10, wherein the thermal protection device comprises a PTC resistor, and the element with a threshold voltage and current characteristic comprises a pair of Zener diodes connected together in a push-pull arrangement.

13. The transformer system of claim 10, wherein the thermal protection device comprises a PTC resistor, and the element with a threshold voltage and current characteristic comprises a varistor.

14. The transformer system of claim 10, wherein the thermal protection device comprises a bimetallic circuit breaker, and the element with a threshold voltage and current characteristic comprises a varistor.

* * * * *